May 14, 1929.   O. C. NICHOLS   1,712,736
ROAD CHARTING APPARATUS
Original Filed Feb. 20, 1923   3 Sheets-Sheet 1
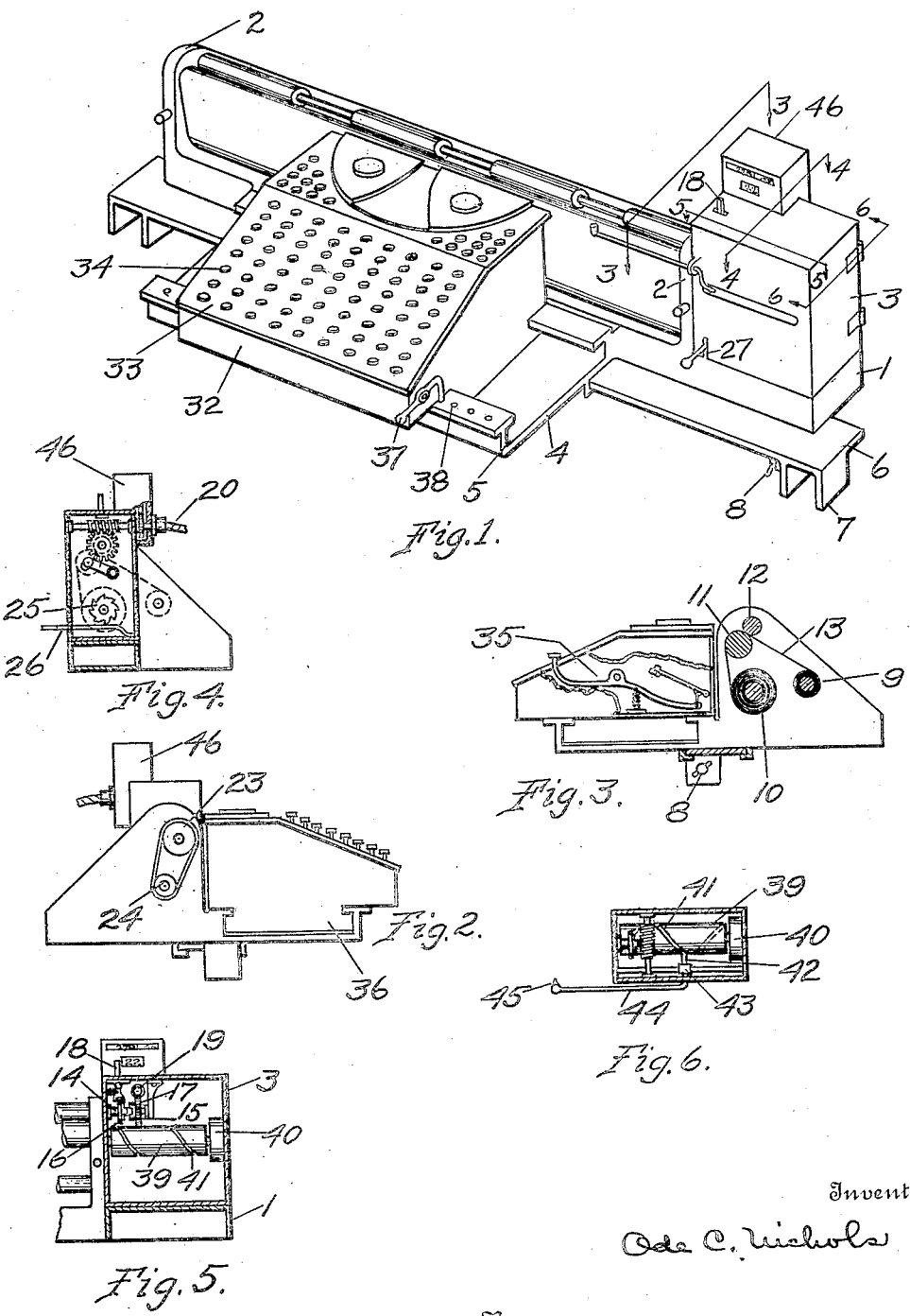
Inventor
Ode C. Nichols
By
Attorney May 14, 1929.      O. C. NICHOLS      1,712,736
ROAD CHARTING APPARATUS
Original Filed Feb. 20, 1923    3 Sheets-Sheet 3

Patented May 14, 1929.

1,712,736

UNITED STATES PATENT OFFICE.

ODE C. NICHOLS, OF UNITED STATES ARMY, FORT D. A. RUSSELL, WYOMING.

ROAD-CHARTING APPARATUS.

Application filed February 20, 1923, Serial No. 620,277. Renewed March 19, 1929.

(GRANTED UNDER THE ACT OF MARCH 3, 1883, AS AMENDED APRIL 30, 1928; 370 O. G. 757.)

This invention described herein may be manufactured and used by or for the Government for governmental purposes, without the payment to me of any royalty thereon.

This invention generically appertains to recorders. More particularly it is directed to an improved apparatus for rapidly and accurately delineating road conditions.

One of the principal objects of this invention is to effect a road charting apparatus which may be mounted on the side car of a motorcycle or other road vehicle and operated by its occupant to produce a graphic chart of the road as the vehicle travels thereover.

Another important object of this invention is to provide a simple and compact apparatus of the character indicated which is manually operable to imprint road indicating symbols on a moving web controlled by the speed of the vehicle.

Another object of this invention is to provide a road charting apparatus having facilities to automatically effect an altitude chart on the web as the latter is advanced by the movement of the vehicle.

With these and other objects in view this invention consists in certain novel details of construction, combination and arrangement of parts to be more particularly hereinafter set forth and claimed.

Briefly stated, this invention comprises a travelling web actuated a definite distance per mile by the movement of the vehicle, manually operated means for imprinting words, symbols or the like on the web during its advancement and means for automatically producing an altitude record.

Referring more particularly to the accompanying drawings in which corresponding parts are indicated by similar reference characters:

Fig. 1 is a perspective view of the recording apparatus forming the subject matter of this application.

Fig. 2 is an end view thereof.

Fig. 3 is a sectionized elevation on the line 3—3 of Figure 1, parts being broken away to disclose the typewriter movement.

Fig. 4 is a transverse vertical section taken on the line 4—4 of Figure 1.

Fig. 5 is a fragmentary longitudinal section taken on the line 5—5 of Figure 1.

Fig. 6 is a horizontal section taken on the line 6—6 of Figure 1, and illustrating the altimeter and recording mechanism controlled thereby.

Figure 7:
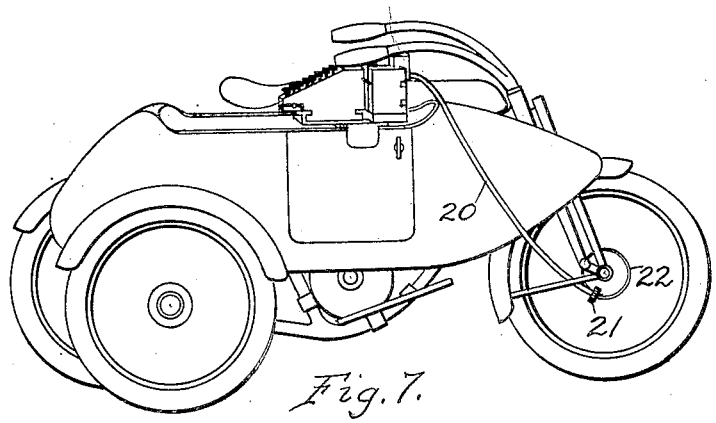
Fig. 7 is a perspective view of motorcycle and side car with recording apparatus operatively attached.

The rapid development of the automobile industry has created an ever growing demand on the part of the touring public for accurate and dependable road guides, the production and maintenance of which involves a continual survey of road conditions by constant inspection trips so that detours necessitated by road repair work may be noted and the route corrected accordingly.

It is also highly essential in connection with military manœuvres, to obtain accurate and definite information relative to the condition and character of the road to furnish data for the transportation of troops and supplies as well as a road guide for tanks and the like as the operators are always enclosed and must depend to a greater or less extent on their road chart for direction. As those obtaining the required information in time of war are subjected to enemy fire, its acquisition must be accomplished as quickly as possible.

It is therefore the aim and purpose of this invention to provide a road recording apparatus, which may be readily attached to a motorcycle side car or in fact any vehicle including laterally spaced parallel side walls and operated typewriter-like by the occupant as the vehicle speeds along the road, thus producing in a minimum time an accurate road record which may be utilized for the commercial or the military purposes specified above.

In the detailed discussion of this invention it will be considered in the order of its principal components namely, frame construction and mounting, web feed, printing device and altimeter controlled mechanism.

*Frame construction and mounting.*

The frame employed in the illustrated embodiment of this invention comprises a base (1) spaced uprights (2), housing (3) and a laterally extending bedplate (4). Bedplate (4) is mortised as at (5) to slidably support a printing device hereinafter to be specified. Base (1) and bedplate (4) are mounted on a supporting bracket (6) formed at its extremities with a pair of depending lugs (7) spaced to embrace the sides of the motorcycle side car, the bracket being secured in position by set screws (8). With this construction of frame and mounting the apparatus may be conveniently positioned in advance of the occupant of the vehicle and readily manipulated.

*Web feeding arrangement.*

To provide a moving web, advanced in accordance with the travel of the vehicle, a web roller (9), reel (10), feed roller (11) and guide roller (12), the latter contacting with feed roller (11) are revolubly mounted between uprights (2) of the frame as shown in Figure 1.

The web roller (9) is shown rotatably journaled between end pieces (2) of the frame but it is understood this roller may be detachably journalled by any suitable structure if desired. A web (13) feeds from web roller (9) between rollers (11 and 12) and is wound on roller (10).

The extremity of roller (11) adjacent housing (3) is formed with a splined extension (14) which latter projects into housing (3), as shown in Figure 5. A female clutch member (15) is slidably positioned on the splined extension (14) and cooperates with a male clutch member (16) affixed to and suitably mounted on pinion (17); the two members being clutched by means of a lever (18).

Pinion (17) meshes with worm (19) connected to one end of a flexible shaft (20), the free end of which is keyed to a pinion (21) meshing with ring gear (22) affixed to the front wheel of the motorcycle.

With this assembly, movement of pinion (21) will be transmitted to the feed roller (11) to actuate the web approximately 3 inches for every mile traveled. Should it be necessary to take up or otherwise adjust the web, the feed roller may be released for this purpose by merely throwing out clutch members (14 and 15) by operation of the lever (18).

As it is essential that the take up of the web be commensurate with the feed the extremity of the feed roller (11) remote from housing (3) is provided with a pulley (23) suitably connected with a pulley (24) on the take up roller (10) both of said pulleys being disposed exterior of the upright (2).

To prevent slack in the web as it is wound upon roller (10) one end of the latter is extended into housing (3) and provided with a ratchet (25) which is normally engaged by detent (26). This detent extends through a slot (27) in the front wall of housing (3) and projects sufficiently beyond the latter to permit its convenient manipulation by the operator whenever it is desired to disengage the detent and ratchet.

The web (13) employed with this apparatus has its impression surface divided by longitudinally extending lines (28) forming an area indicative of the road or trail traveled and within which may be printed road characterizing symbols as well as direction indicia 28' showing the trend of the road. The web is likewise ruled transversely as at (29) to afford lineal measurements and longitudinally at its right and left hand side as at (30) to furnish altitude readings (31).

It is to be understood however, that web (13) may be prepared to give any measurement desired dependent on the exigencies of the situation.

*Printing device.*

To effect an impression on the web as it passes over the feed roller (11) a printing means is employed operating on the principle of a typewriter and consisting of typewriter frame (32) key board (33) keys (34) and type-movement (35).

The base of frame (32) is formed with a tenon (36) which is slidably positioned in mortised bedplate (4) of frame (1) to enable actuation of the machine transverse of the travel of the web for the purpose of effecting an imprint of the characters on the right or left hand side of the web.

To lock the frame in adjusted position a detent (37) is swiveled to the side of the frame (32) the end of the detent being bent downwardly to engage annular recesses (38) in bedplate (4).

The key board arrangement of the machine may be varied, depending on the character of printing desired, but in the present embodiment each key bears a definite legend such as canal, bridge, aqueduct, quarry, oil well, cemetery, etc. A depression of any one of these keys produces an impression on the web of a symbol representative of the legend.

In addition to the keys referred to, there are, of course, the usual numeral-shifts and other keys incidental to standard typewriter construction.

In view of the above it is manifest that as the various characterizing marks are passed enroute, the operator depresses the key indicative thereof and the symbol is impressed on the moving web at the exact point where such marks are located and when the trip is completed a chart is obtained with every detail of the route clearly outlined.

*Altimeter control mechanism.*

To produce an altitude record on the web, a cylinder (39) is journalled within housing (3) and rotated by an altimeter (40) which may be of any standard design. The surface of cylinder (39) is formed with a helical groove (41) into which there projects an extension (42) of the slidably mounted block (43). This block carries an indicator arm (44) which passes through the casing and overlies the web as shown in Figure 1.

Figure 8:
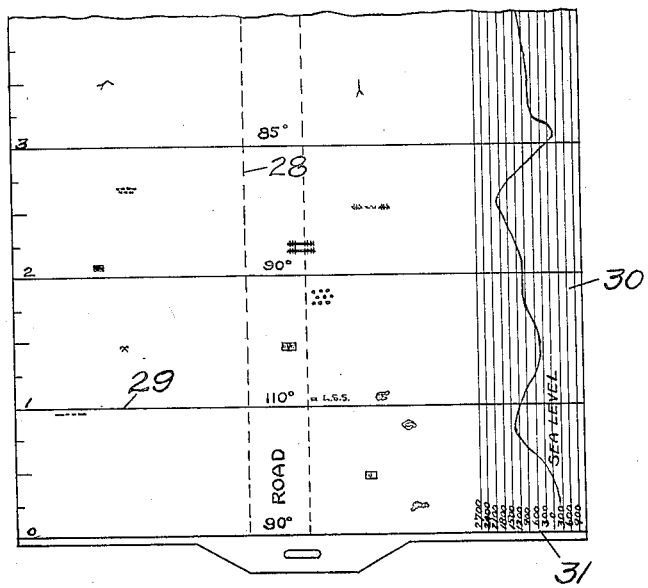
Fig. 8 is a plan of the fragment of the web as it appears after charting.
Figure 9:
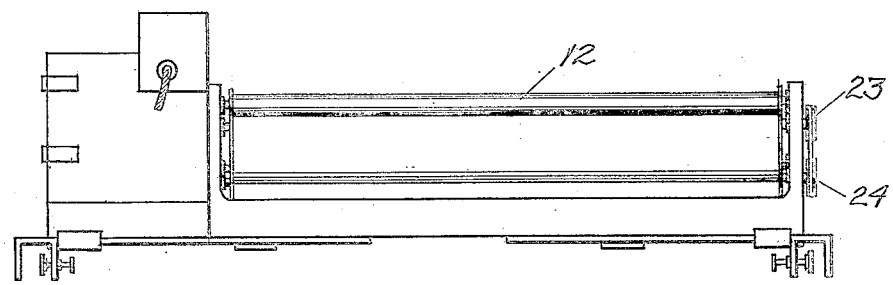
Fig. 9 is a rear elevation of the recording apparatus.
Figure 10:
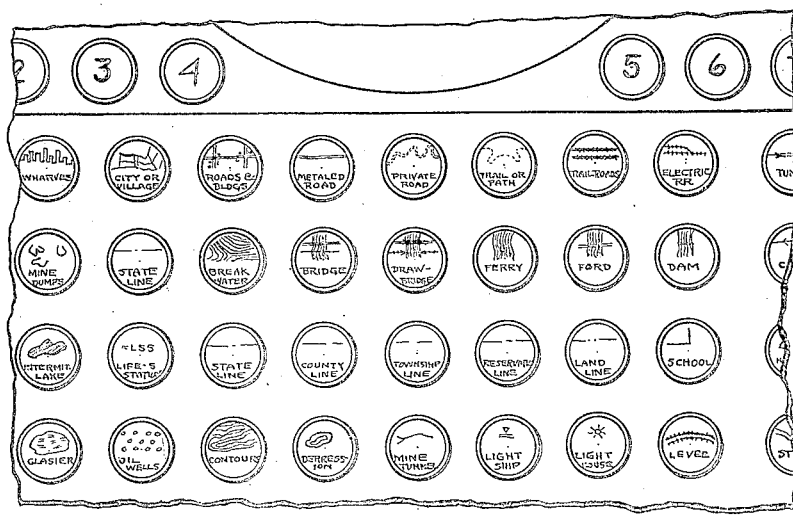
Fig. 10 is a fragmentary plan of the key board.

The free end of arm (44) is provided with a marker (45) which bearing against the web as it advances, effects an altitude graph such as that shown in Figure 8.

A suitable speedometer (46) actuated by the speedometer shaft, hereinbefore referred to, is mounted in housing (3) to supplement the mileage record furnished by the web. Likewise a compass (not shown) may be attached to the apparatus at some convenient point to provide location readings when necessary.

In conclusion it will be observed the foregoing apparatus forms a route recorder which is simple, inexpensive and capable of rapidly producing an accurate record in an extremely convenient manner.

Although in the foregoing certain elements have been described as best adapted to perform the functions alloted to them, nevertheless it is to be understood that various minor changes with respect to the character of the typewriter employed, the manner of feeding the web or advancing it in accordance with the speed of the vehicle, may be resorted to within the scope of the appended claims without departing from or sacrificing any of the principles of this invention.

Having described my invention what I claim as new and wish to secure by Letters Patent is:

1. A device for mounting a recording apparatus on a vehicle including laterally spaced parallel side walls, said device comprising a supporting bar adapted to span the side walls of the vehicle, means in connection with the extremities of the bar to embrace the upper edges of said walls, a housing affixed to the bar and adapted to contain a travelling web, an extension projecting horizontally from and intermediate the extremities of the housing, a recording mechanism mounted upon the extension and adjustable thereover relative to the housing and coacting means in connection with the recording mechanism and said extension to secure said mechanism at predetermined points in the path of its travel.

2. A device for mounting a recording apparatus on a vehicle including laterally spaced parallel side walls, said device comprising a supporting bar adapted to span the side walls of the vehicle, means in connection with the extremities of the bar to embrace the upper edges of said walls, a housing affixed to the bar and adapted to contain a travelling web, an extension projecting horizontally from and intermediate the extremities of the housing, parallel guides carried by the extension, a recording mechanism slidably mounted upon the guides and a dog pivotally affixed to said mechanism and coacting with apertures in one of the guides to fixedly secure the mechanism at predetermined points in the path of its travel over said guides.

ODE C. NICHOLS.